Jan. 6, 1953
M. KNOBEL
2,624,122
INSPECTION GAUGE
Filed Aug. 23, 1947
3 Sheets-Sheet 1
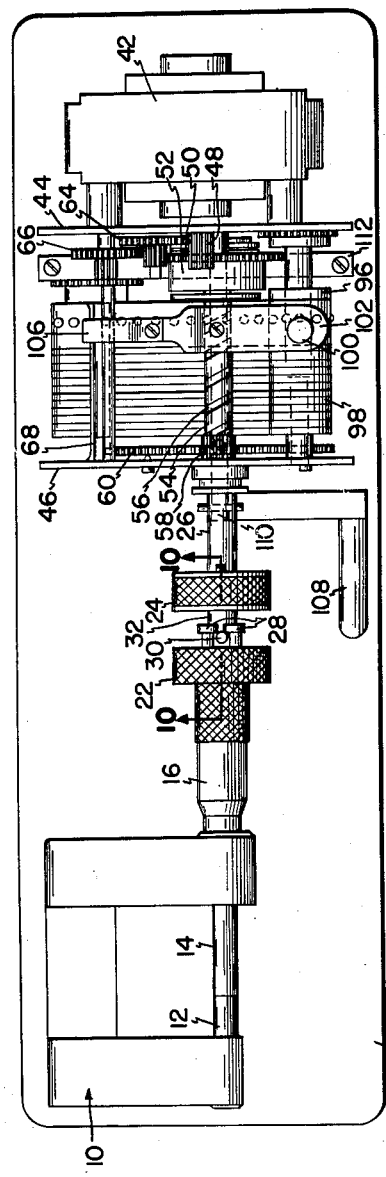
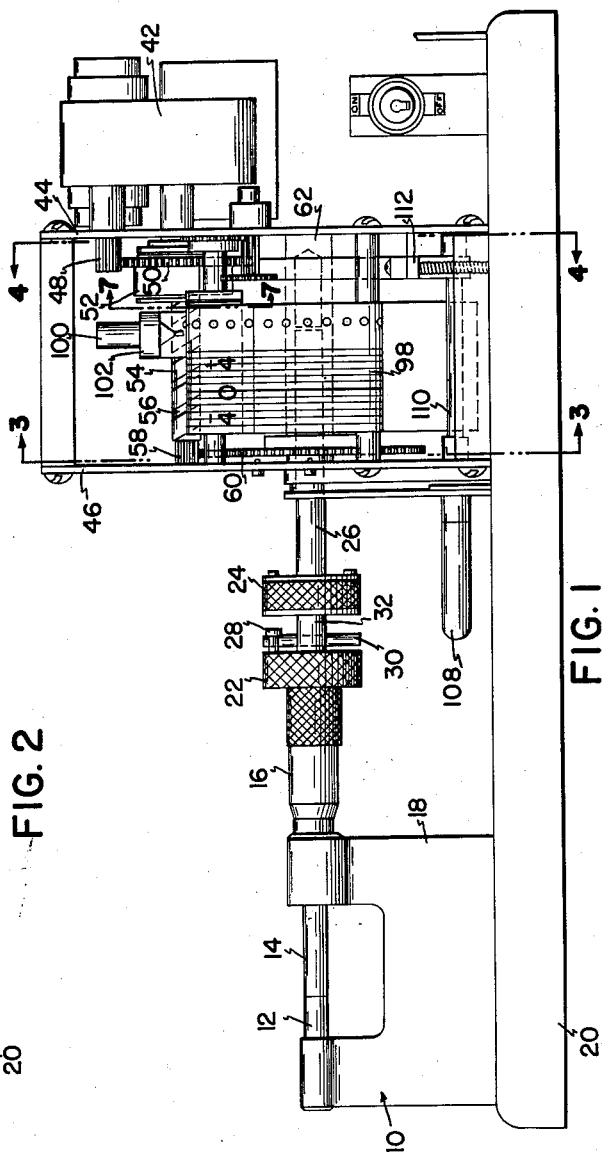
INVENTOR.
MAX KNOBEL
BY *Jenney & Hildreth*
ATTORNEYS Jan. 6, 1953   M. KNOBEL   2,624,122
INSPECTION GAUGE Filed Aug. 23, 1947   3 Sheets-Sheet 2

INVENTOR.
MAX KNOBEL
BY *Jenney & Hildreth*
ATTORNEYS

Jan. 6, 1953 M. KNOBEL 2,624,122
INSPECTION GAUGE
Filed Aug. 23, 1947 3 Sheets-Sheet 3

INVENTOR.
MAX KNOBEL
BY Jenney & Hildreth
ATTORNEYS

Patented Jan. 6, 1953

2,624,122

UNITED STATES PATENT OFFICE 2,624,122

INSPECTION GAUGE

Max Knobel, Arlington, Mass., assignor to K. T. Laboratories, Inc., Boston, Mass., a corporation of Massachusetts Application August 23, 1947, Serial No. 770,288

7 Claims. (Cl. 33—164)

1

The present invention relates to gages and more particularly to gages for inspecting the dimensions of manufactured articles.

In a copending application, Serial No. 678,024, filed June 20, 1946, now Patent No. 2,596,696, I have described a type of inspection gage which gives a charted record of the actual measurements of a series of manufactured production items. The particular form of gage shown in that application comprised a pneumatic device to detect differences from standard by the pneumatic action of a jet of air. In another application, Serial No. 755,954, now abandoned, filed June 20, 1947, I have described mechanical apparatus for automatically gaging and recording the dimension of the article.

The object of the present invention is to provide improvements in apparatus of this character, with a particular view toward rapid operation.

In its simplest and best form the present invention comprises a micrometer which may be of standard construction, combined with automatic drive means for mechanically operating the micrometer to bring it into contact with work at a substantially uniform pressure and for recording the gaged dimension of the work.

Other features of the invention consist of certain novel features of construction and combinations and arrangement of parts hereinafter described and particurlarly defined in the claims.

Figure 3:
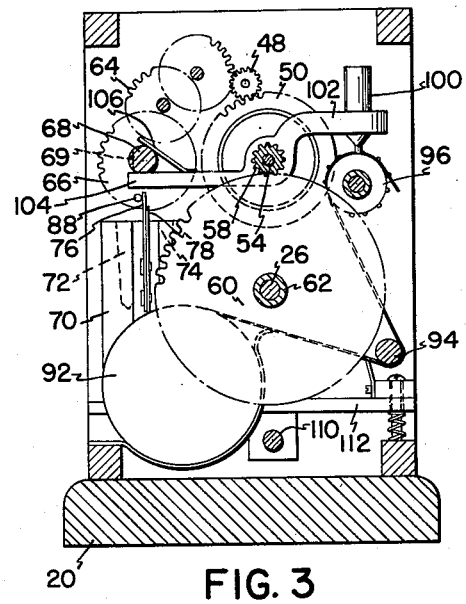
Figure 4:
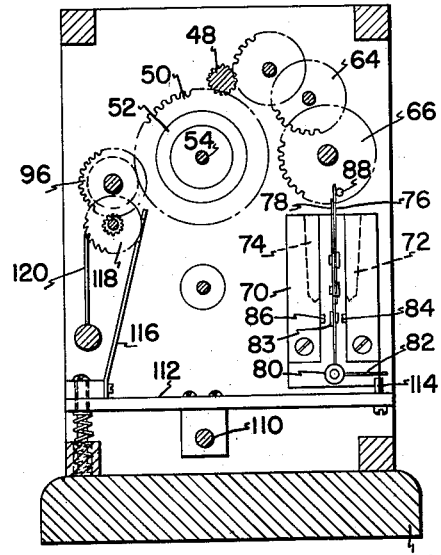
Figure 5:
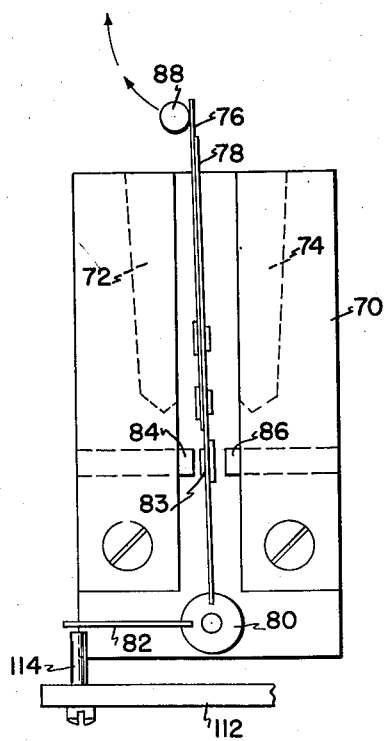
Figure 6:
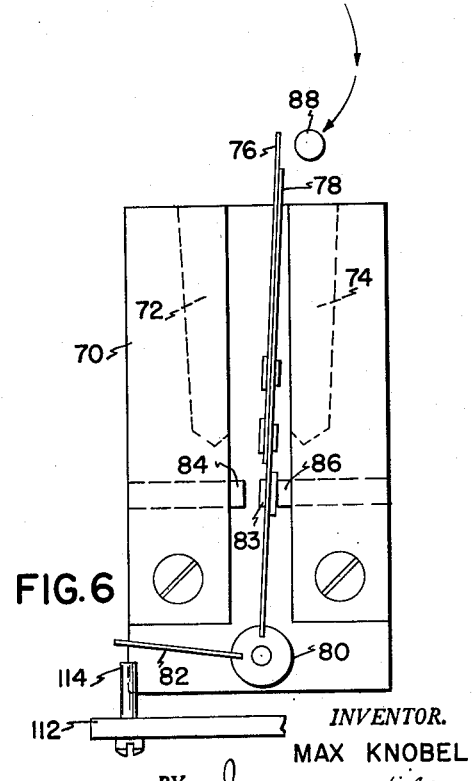
Figure 7:
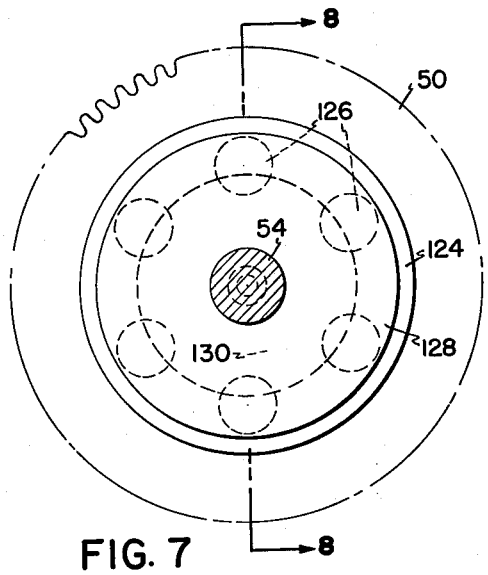
Figure 8:
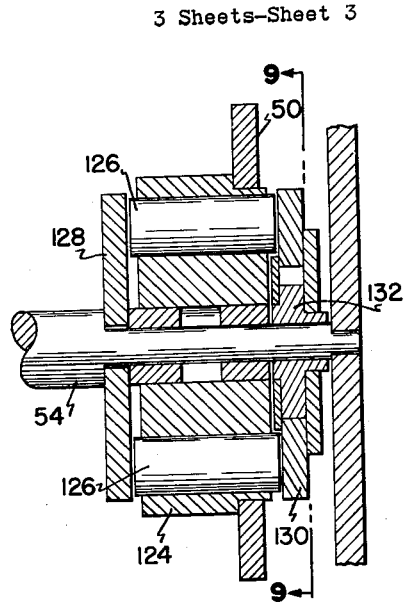
Figure 10:
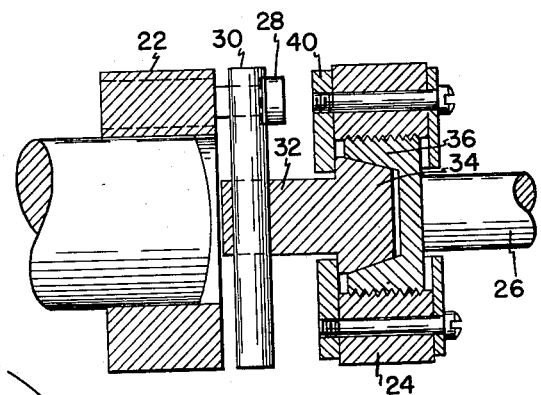
Figure 9:
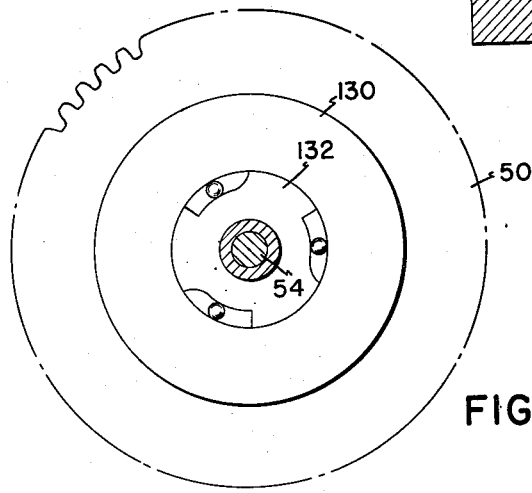

In the accompanying drawings Fig. 1 is a side elevation of the preferred machine; Fig. 2 is a plan view; Figs. 3 and 4 are sections on lines 3—3 and 4—4, respectively, of Fig. 1; Figs. 5 and 6 are detail views of the limit and reversing switch; Figs. 7, 8 and 9 are detail views of the torque-transmitting devices; and Fig. 10 is a sectional view of the clutch.

As shown in Figs. 1 and 2, the present invention comprises a micrometer 10 of standard construction, having a fixed anvil 12 and a screw threaded anvil 14, the latter being adapted to be moved by the knob 16. The anvils are mounted in a frame 18 which is here shown as mounted on a base 20.

Secured to the knob 16 is a milled head 22 to which is coupled a driving member 24 connected with a shaft 26 which, as will be later described, is power-driven for operation of the micrometer. The coupling preferably comprises two pins 28 projecting from the rear of the head 22 between which is received a transverse rod 30 adapted to be rotated by a stud 32. As shown in Fig. 10, the stud 32 terminates in a conical member 34 forming part of a clutch, the other member of which is designated at 36 and is mounted on the drive shaft 26. The head 24

2 is threaded on the member 36 and carries a face plate 40 adapted to abut the front face of the clutch member 34 to hold the clutch in engaged position. The purpose of this arrangement is to permit adjustment of the apparatus for different sizes of work as will be later described.

The driving means comprises a motor 42 mounted on a frame which as shown in Figs. 1 and 2 comprises two end plates 44 and 46. The end plates constitute an enclosure for the driving and recording devices. This enclosure may be suitably covered by a glass or plastic casing (not shown) to protect the mechanisms against entrance of dust or chips.

The motor is connected through a pinion 48 and a gear 50 with a torque-transmitting slip mechanism indicated generally at 52 which will be subsequently described in detail. It is sufficient to note here that the slip mechanism is capable of applying only a definite and predetermined torque to the output shaft 54, whereby a uniform measuring pressure is applied to the work by the micrometer.

The output shaft 54 is provided with a long pitch thread 56 as indicated in Figs. 1 and 2 serving as a means for operating the recording pen which will be later described. At its forward end the shaft carries a pinion 58 meshing with a gear 60 which drives a shaft 62. The micrometer drive shaft 26 is splined within the shaft 62 in any suitable manner whereby the shaft 26 is capable of both rotary and longitudinal motion upon rotation of the shaft 62.

It will be seen that if the anvils of the micrometer are separated and the work piece is introduced, then upon operation of the motor, the shaft 26 may be rotated to bring the anvil 14 into contact with the work piece. Suitable limit and reversing switches are provided whereby the micrometer is arranged for only a limited movement, preferably within a range of, say, 0.004 inch from standard dimensions. To this end the motor pinion 48 is connected through a gear train 64 terminating in a gear 66 which drives a shaft 68 extending across the frame. The gear 66 also controls the motor switch. The switch comprises block 70 carrying two separated magnets 72 and 74. Between the magnets is a flexible arm 76 of non-magnetic material, such as Phosphor bronze, riveted near one end to a steel strip 78. This strip is adapted to be attracted at one side or the other by one of the magnets. The strip 78 is connected to a hub 80 from which a spring steel arm 82 extends laterally for the purpose of manually initiating operation of the switch. The strip 78 has a contact 83 and is adapted for contact with either of two fixed contacts 84 and 86, determining forward and reverse operation of the motor. It will be seen that the switch arrangement gives a snap action, whereby if the contact strip is moved beyond the middle position, the steel strip 78 will be attracted to the opposite magnet. It is also possible to hold the contact strip in a neutral position whereby the motor circuit is closed on neither of the contacts 84, 86.

The switch is operated by a pin 88 on the final gear 66 of the train which operates the shaft 68. At the start the switch is held open as shown in Fig. 5 by the contact 88. The steel strip 78 is attracted to the left magnet 72, but the pin flexes both strips sufficiently to hold the contacts separated. Upon slight lifting of the lateral arm 82 manually as will be presently described, the strip is thrown beyond the middle position so that it is attracted to the right magnet 74 and contact 83 closes on contact 86, thereby starting the motor in the forward direction. The pin 88 travels clockwise as viewed in Figs. 5 and 6. The motor continues to operate until the limit pin 88 completes nearly a revolution and strikes the end of the non-magnetic strip 76 and throws it beyond center into the field of the magnet 72. This closes the motor circuit on contact 84, thereby reversing the motor and carrying it back (counter-clockwise) until the limit pin 88 engages the strip 76 and moves it just far enough to open the motor circuit, thus restoring the parts to their original position. It will be seen, therefore, that upon each operation the gear 66 undergoes a certain definite motion forward and back. However, the slip drive shaft 54 and all parts controlled thereby are brought to a stop when the motion of the micrometer anvil is impeded by the presence of a work piece.

The recording mechanism comprises a paper roll 92 from which paper is fed over an idler 94 and a drive roll 96, the latter having sprocket teeth to engage in suitable holes of the paper. As shown in Figs. 1 and 2, the paper is indicated at 98 and is provided with lines indicating normal size of the work piece and variations up to 0.004 inch. The pen 100 is mounted in an arm 102 and is free to rock on the threaded shaft 54, but has means for engaging the threads 56 to traverse the pen as the shaft is rotated. The carriage 102 is provided with a tail 104 bearing against the underside of the shaft 68. A spring steel member 106 attached to the tail 104 embraces the opposite side of the shaft and holds the pen carriage normally in correct position. The shaft is slabbed off to provide a flat portion indicated at 69, positioned so that as the gear 66 reaches the limit of its forward movement, the tail 104 of the carriage will retract against the slabbed portion of the shaft. This allows the pen to drop and make a mark on the paper. Upon reverse motion of the shaft 68, the pen is lifted from the paper and is restored to its original position shown in Figs. 1 and 2.

The mechanism for operating the device comprises a crank 108 mounted immediately in back of the coupling device 24. The crank is mounted on a shaft 110 which is pivoted in the frame. The shaft carries an arm 112 which has at its outer end a pin 114 adapted to underlie the lateral projection 82 of the switch contact member. Thus, upon turning the shaft, the pin 114 engages the member 82 and flexes the strip 76 from the position of Fig. 5 to that of Fig. 6, as previously described. The rocking bar 112 is also provided with means for advancing the paper. At the end opposite from the pin 114, the bar is provided with a spring pawl 116 to engage a ratchet 118 on the shaft of the paper drive roll 96. A spring detent pawl 120 is provided to prevent reverse rotation.

The slip member 52 has been mentioned and will now be described in detail, with reference to Figs. 7, 8 and 9. The gear 50 which is driven by the motor pinion 48 is attached to a body 124 in which are mounted a number of small permanent magnets 126, here shown as six, and preferably of a high coercive material such as Alnico. Mounted on the shaft 54 is a disk 128 of high hysteresis material such as cunico, the disk being adapted to rotate immediately adjacent to the ends of the magnets as shown in Fig. 8. A device of this kind transmits an exceptionally uniform maximum torque regardless of temperature, speed of rotation, and other factors. Hence, the micrometer pressure will be virtually constant. It will be noted that when motion of the movable anvil 14 of the micrometer is stopped the gear 50 will continue to rotate until the motor reversing switch is closed but the pressure applied by the micrometer will remain substantially constant.

Owing to the fact that starting friction is higher than running friction, the frictional resistance to the return motion of the micrometer anvil 14 is usually greater than the force with which the anvil is brought into engagement with the work through the slip mechanism. Hence, in most instances the slip mechanism thus far described would not apply sufficient torque to retract the anvil upon reverse rotation of the motor. It is therefore necessary to provide a greater torque for the retracting movement than for the forward movement. To this end, a second cunico disk 130 is mounted adjacent to the opposite ends of the magnets 126. The disk 130 is connected to the shaft 54 through a one-way drive mechanism 132 here illustrated as a ball-type clutch shown in Fig. 9. Accordingly, while a certain torque is applied to the shaft 54 through the magnets 126 and the disk 128, a greater torque is applied to the shaft through the same magnets 126 and both disks 128 and 130 for the reverse motion. This increased torque is sufficient to free the micrometer anvil from the work and restore the parts to their original position.

The operation will now be described. It is first necessary to set the apparatus for the standard size work piece. This is done by releasing the clutch cones 34, 36 by operation of the knurled head 24 and backing the micrometer off until it reads the correct measurement of the work piece plus the maximum oversize variation which the chart is capable of recording. For example, if the correct work piece size is .250 inch, the micrometer is backed off until it reads .254 inch. During this operation the shaft 26 simply moves longitudinally within the spline. The clutch is then tightened and the device is ready for the gaging operation. A piece of work is introduced between the jaws of the micrometer and the crank 108 is depressed. This actuation of the handle advances the paper one notch and it starts the motor in the forward direction. Through the slip mechanism, the anvil 14 is brought into engagement with the work at a certain definite pressure. As soon as the work is engaged the shaft 54 stops and hence stops the pen. The gear train 64 continues to operate until the slabbed shaft 68 comes to a position where the pen will drop to engage the paper. Shortly thereafter the reversing mechanism is brought into operation, thereby lifting the pen off the paper and restoring the pen to its original position. The gear ratio is such that the chart accurately records the dimension of the work piece. As heretofore noted, the chart size is preferably such as to indicate size within a range of plus or minus 0.004 inch. Accordingly, the initial setting of the micrometer must be greater than the desired size by 0.004 inch since that represents the one limit of motion of the pen. Hence, if the work piece is oversize by 0.004 inch, it will be just possible to insert it between the jaws of the micrometer and the pen will not be moved at all by the motor. If the piece is exactly accurate, the pen will make a mark at the center line of the chart. If the piece is undersized by 0.004 inch or more the pen will execute its extreme motion and make a mark at the left side of the chart.

The device may be operated with exceptional rapidity and will operate to give a charted record of all of the inspected work pieces. As noted in my copending applications above referred to, the trend of operations is indicated by the record. Thus, when the machine operations are satisfactory the charted record will show only slight variations above the center line. Wider variations indicate some looseness or excessive tolerance in the machine tools which should be corrected. A drift toward larger or smaller dimensions may be detected in time to make corrections before discarding of the work pieces becomes necessary. The apparatus has the advantage that it utilizes the simple mechanical micrometer which is familiar to most mechanics and which is recognized as being of exceptional accuracy. It will be understood that the greatest accuracy of which the instrument is capable is attained by the present invention because of the uniformity of pressure on the work.

Having thus described the invention, I claim:

1. A recording gage comprising a screw micrometer, a motor, connections between the motor and the micrometer screw, a marker, means for moving the marker in accordance with the motion of the screw, means for causing rotation of the motor by a substantially uniform amount for each gaging operation, means operated at the limit of movement of the motor for effecting a marking operation of the marker, and slip means to permit operation of the motor after engagement of the screw with a piece to be gaged.

2. A recording gage comprising a screw micrometer, a motor, connections between the motor and the micrometer screw, a marker, means for moving the marker in accordance with the motion of the screw, a limit switch to determine a substantially uniform forward motion of the motor for each measuring operation, slip means to permit rotation of the motor after the motion of the micrometer has stopped, means for effecting a marking operation of the marker near the limit of forward movement of the motor, and means for automatically reversing the motor and restoring it to its original position.

3. A recording gage comprising a screw micrometer, a motor, connections between the motor and the micrometer screw, a marker, means for moving the marker in accordance with the motion of the screw, a reversing switch for the motor, and slip means to permit the motor to overrun said connections, the slip means having provision for transmitting greater torque in one than in the other direction.

4. A recording gage comprising a screw micrometer, a motor, connections between the motor and the micrometer screw, a marker, means for moving the marker in accordance with the motion of the screw, means for causing rotation of the motor by a substantially uniform amount for each gaging operation, means operated at the limit of movement of the motor for effecting a marking operation of the marker, slip means to permit operation of the motor after engagement of the screw with a piece to be gaged, means for reversing the motor after rotation thereof through said limited amount, and means for stopping the motor when it is restored to its original position.

5. A recording gage comprising a screw micrometer, a motor, connections between the motor and the micrometer screw, a marker, means for moving the marker in accordance with the motion of the screw, a limit switch to determine a substantially uniform forward motion of the motor for each measuring operation, slip means to permit rotation of the motor after the motion of the micrometer has stopped, means for effecting a marking operation of the marker near the limit of forward movement of the motor, means for automatically reversing the motor and restoring it to its original position, and means for stopping the motor when it is restored to its original position.

6. A recording gage comprising a screw micrometer, a motor, connections between the motor and the micrometer screw, a marker, means for moving the marker in accordance with the motion of the screw, non-rigid constant-torque slip means between the motor and the screw, means for causing rotation of the motor by a substantially uniform amount for each gaging operation, means for operating the marker at a point determined by the limit of motion of the screw, and reversing means to restore the motor and screw to their original positions.

7. A recording gage comprising a screw micrometer, a motor, connections between the motor and the micrometer screw, a marker, means for moving the marker in accordance with the motion of the screw, non-rigid constant-torque slip means between the motor and the screw, means for causing rotation of the motor by a substantially uniform amount for each gaging operation, means for operating the marker at a point determined by the limit of motion of the screw, and reversing means to restore the motor and screw to their original positions said reversing means including additional slip means to apply a greater torque in the reverse direction than in the forward direction.

MAX KNOBEL.

REFERENCES CITED

The following references are of record in the file of this patent:

UNITED STATES PATENTS

| Number | Name | Date |
|---|---|---|
| 1,446,300 | Lawrence et al. | Feb. 20, 1923 |
| 2,294,831 | Carson | Sept. 1, 1942 |
| 2,305,816 | Sonnberger | Dec. 22, 1942 |
| 2,323,910 | Hubbell | July 13, 1943 |
| 2,346,883 | Wait | Apr. 18, 1944 |
| 2,403,378 | Kilpela | July 2, 1946 |
| 2,406,238 | Miller | Aug. 20, 1946 |
| 2,410,746 | Raettig | Nov. 5, 1946 |
| 2,442,561 | Finch | June 1, 1948 |